United States Patent Office 3,333,971
Patented Aug. 1, 1967

3,333,971
REFRACTORY COMPOSITION
Bernard D. McKenna, San Jose, Calif., assignor to Kaiser Aluminum & Chemical Corporation, Oakland, Calif., a corporation of Delaware
No Drawing. Filed Dec. 29, 1965, Ser. No. 517,458
7 Claims. (Cl. 106—57)

ABSTRACT OF THE DISCLOSURE

A refractory bonding composition containing $Al_2O_3$ and sufficient MgO to form magnesium aluminate spinel is improved with respect to cracking and weakening by the addition of $ZrO_2$.

---

This invention concerns refractory compositions and particularly refractory bonding compositions.

Refractory compositions consist, in general, particularly in the case of compositions intended to be fired before use, of a portion of relatively coarse refractory aggregate, for example material retained on a 100 mesh screen, and a portion of relatively fine material, for example material passing a 100 mesh screen, to provide a ceramic or high temperature bond. During a firing operation, the finely divided bonding materials react among themselves or with the refractory aggregate or both to form a strong, dense, coherent mass.

It has long been known to use as bonding material, particularly for bonding non-acid refractory aggregate, bonding compositions consisting of alumina or an $Al_2O_3$-yielding material together with magnesia or an MgO-yielding material, these two materials reacting during the firing operation to form magnesium aluminate spinel $$(MgO.Al_2O_3)$$

However, it has been a continuing problem with these spinel bonded refractories that, during the firing operation, the spinel material undergoes a large and rapid volume change at a temperature of about 1150° C., this volume change frequently leading to cracking and consequent weakening, if not outright fracturing, of the refractory.

It has now been found, according to this invention, that in a refractory bonding composition containing at least 12% $Al_2O_3$ either in the form of finely divided alumina or an alumina-yielding material which will yield that amount of $Al_2O_3$, together with at least sufficient finely divided MgO, either in the form of magnesia or an MgO-yielding material, to react with all of the finely divided $Al_2O_3$ to form magnesium aluminate spinel, the problem of cracking during the firing of the bonding composition can be avoided by incorporating into the bonding composition from 3% to 15% by weight of $ZrO_2$, either as zirconia itself or as a $ZrO_2$-yielding compound which will yield that amount of $ZrO_2$, for example upon heating to a temperature of at least 1000° C.

Within the terms "MgO-yielding" and "$Al_2O_3$-yielding" material, and the like, it is meant to include not only materials such as magnesium hydroxide, magnesium carbonate, aluminum hydroxide, and the like which will yield MgO, $Al_2O_3$, etc., for example upon heating to a temperature of at least 1000° C., but also such materials as lightly calcined magnesia, calcined alumina, as well as dead-burned magnesia and alumina in the form of corundum, which consists essentially of $Al_2O_3$. It will be understood that mixtures of magnesia, for example, and MgO-yielding material can be used.

Differently expressed, the refractory bonding composition of this invention consists of from 12% to 40% by weight $Al_2O_3$, from 45% to 85% by weight MgO, and from 3% to 15% by weight $ZrO_2$. It has been found that the amount of $ZrO_2$ (by weight) should not exceed half that of $Al_2O_3$ in the bonding composition. In a preferred form of this invention, the amount of $ZrO_2$ used is about ¼ the weight of $Al_2O_3$ in the bonding composition.

The $ZrO_2$ material used in the practice of this invention is preferably zirconia in finely divided form, but any material which will yield $ZrO_2$ upon firing can be used, for example $Zr(OH)_4$.

As indicated above, all the materials of the bonding composition according to this invention are finely divided, for example substantially all passing a 100 mesh screen. Preferably, the major portion of each of them, for example at least 65%, passes a 325 mesh screen.

Generally, the bonding composition of this invention will be used in conjunction with a refractory aggregate, that is to say, a relatively coarse refractory material, for example material retained on a 100 mesh screen. Generally, the bonding portion of the composition will comprise from about one quarter to about one half of the weight of the total composition. Accordingly, compositions according to this invention can be expressed as consisting essentially of from 5% to 15% by weight $Al_2O_3$, from 20% to 35% MgO, and from 1% to 7.5% $ZrO_2$, the balance of the composition being refractory aggregate, all of which is retained on a 100 mesh screen.

While any refractory aggregate can be used, the bonding compositions of this invention have been found to be particularly useful with non-acid refractory compositions, for example compositions containing dead-burned dolomite, alumina, periclase, chrome ore, and admixtures of these with each other.

It is an advantage of refractory bonding compositions according to this invention that the use of them avoids the problem of cracking and weakening heretofore found in spinel bonds.

The refractory bonding compositions according to this invention can be used to bond refractory aggregate in the form of refractory shapes such as bricks, or can be used to bond refractory aggregate into a monolithic structure, or can even be used by itself, for example as a mortar to bond preformed refractory shapes.

As an example of the practice of this invention, 8 parts by weight of calcined alumina and 2 parts by weight $ZrO_2$ are ground together in a ball mill until substantially all of the material passes a 100 mesh screen and about 75% passes a 325 mesh screen. To this ball milled alumina and zirconia are added 30 parts periclase which has been ball milled until 65% passed a 325 mesh screen. This bonding component is then added to 60 parts by weight of periclase aggregate all of which is retained on a 100 mesh screen. To this refractory composition is added 1%, based on the total weight of the refractory, of $CrO_3$ as a cold setting bond and the composition pressed into brick shapes in a power press under a pressure of 10,000 p.s.i. These bricks are then fired to a temperature of 1350° C. After firing, the bricks are whole and strong and do not exhibit the cracking which is observed in prior art compositions the same as those of this example but without the addition of any $ZrO_2$.

In the specification and claims, percentages and parts are by weight unless otherwise indicated. Mesh sizes referred to herein are Tyler Standard Screen sizes which are defined in Chemical Engineers Handbook, John F. Perry, Editor-in-Chief, Third Edition, 1950, published by McGraw-Hill Book Co., at page 963.

Having now described the invention, what is claimed is:
1. A refractory bonding composition consisting essentially of at least sufficient $Al_2O_3$-yielding material to yield 12% by weight $Al_2O_3$ and at least sufficient MgO-yielding material to yield sufficient MgO to form magnesium alu- minate spinel and a compound which will yield, upon heating to at least 1,000° C., from 3% to 15% by weight of the total bonding composition of $ZrO_2$.

2. A bonding composition according to claim 1 wherein all the materials in the composition pass a 100 mesh screen.

3. A bonding composition according to claim 2 wherein at least 65% of each of said materials passes a 325 mesh screen.

4. A refractory bonding composition according to claim 1 consisting essentially of from 45% to 85% MgO in the form of an MgO-yielding material, from 12% to 40% $Al_2O_3$ in the form of an $Al_2O_3$-yielding material, and from 3% to 15% $ZrO_2$ in the form of a $ZrO_2$-yielding material, the amount of $ZrO_2$ being not more than half the amount of $Al_2O_3$.

5. A bonding composition according to claim 4 wherein substantially all of said material passes a 100 mesh screen.

6. A bonding composition according to claim 5 wherein at least 65% of each of said materials passes a 325 mesh screen.

7. A refractory bonding composition according to claim 1 consisting essentially of about 75% finely divided periclase, about 20% divided alumina, and about 5% finely divided $ZrO_2$, substantially all of said materials passing a 100 mesh screen.

References Cited
UNITED STATES PATENTS 2,695,242  11/1954  Woodward _____ 106—62
3,184,322  5/1965  Parikh et al. _____ 106—62

TOBIAS E. LEVOW, *Primary Examiner.*

J. E. POER, *Assistant Examiner.*